United States Patent [19]

Overbergh et al.

[11] Patent Number: 4,877,660
[45] Date of Patent: Oct. 31, 1989

[54] RECOVERABLE FABRIC SLEEVE

[75] Inventors: Noel M. M. Overbergh, Bertem; Jan L. M. F. G. Vansant, Korbeek-Lo, both of Belgium

[73] Assignee: Raychem Corporation, Menlo Park, Calif.

[21] Appl. No.: 152,123

[22] Filed: Feb. 4, 1988

[30] Foreign Application Priority Data

Feb. 9, 1987 [GB] United Kingdom ............... 8702833

[51] Int. Cl.$^4$ ............................................. H02G 15/18
[52] U.S. Cl. ................................... 428/34.9; 138/123; 139/420 C; 174/DIG. 8; 174/92; 428/36.1; 428/220; 428/229; 428/245; 428/246; 428/251; 428/257
[58] Field of Search .................. 174/DIG. 8, 92; 138/123, 125; 139/420 C, 420 R; 156/86, 49; 428/36, 229, 245, 246, 251, 257, 254, 285, 286, 287, 290, 220, 34.9, 36.1

[56] References Cited

U.S. PATENT DOCUMENTS

| 4,202,382 | 5/1980 | Westhead | 139/383 A |
| 4,624,720 | 11/1986 | Pithouse et al. | 174/DIG. 8 |
| 4,626,458 | 12/1986 | Pithouse et al. | 174/DIG. 8 |
| 4,631,098 | 12/1986 | Pithouse et al. | 174/DIG. 8 |
| 4,761,194 | 8/1988 | Pithouse et al. | 174/DIG. 8 |

FOREIGN PATENT DOCUMENTS 2135836 9/1984 United Kingdom .

Primary Examiner—Ellis P. Robinson
Assistant Examiner—James J. Seidleck
Attorney, Agent, or Firm—A. S. Zavell; Herbert G. Burkard

[57] ABSTRACT

A sleeve suitable for making a cable splice case comprises a matrix material and a recoverable fabric by virtue of which the sleeve is recoverable. The sleeve comprises recoverable weft fibres in bundles of 2-6 running circumferentially, and longitudinal heat-stable warp fibres.

24 Claims, 3 Drawing Sheets

Fig.5b.
WEFT

Fig.6a.

Fig.6b.
WEFT

Fig.7a.

Fig.7b.
WEFT

RECOVERABLE FABRIC SLEEVE

The present invention relates to a recoverable fabric sleeve for the environmental protection of a junctions in elongate substrates, such as splices in cables, particularly in telecommunications cables.

BACKGROUND OF THE INVENTION

It is frequently necessary to protect such junctions against the environment in order that the cables or other substrates may continue to function properly. Protection generally has to be provided against moisture, corrosive chemicals as well as insect and animal damage etc. The intention when enclosing a junction such as a cable splice is to make good the original cable insulation that had to be removed in order to connect the conductors, and it is generally required that the life-time of the seal provided by the new enclosure be comparable to that of the original cable insulation. It will be appreciated therefore that the material of the enclosure must provide a highly resistant barrier for a considerable period of time.

One way of providing such a barrier is to install around the cables a splice case comprising an imperforate sleeve of a modified polyolefinic material in conjunction with a high performance adhesive. Such sleeves are conveniently produced by extruding a continuum of material. The sleeve is preferably made recoverable so that it can be shrunk (or otherwise recovered) into close contact with the cables.

There is a further consideration relevant to the design of enclosures for cable splices, and that is the ability to retain pressure. Many types of cables and splice cases are pressurised during use, are assessed in terms of pressure retention to determine their quality, or become subject to incidental pressurisation during use. The importance of this consideration is of course different in each of these three situations, but it is accepted that the ability to retain some degree of pressure is a necessary feature of a splice case if environmental protection is to be achieved.

The most stringent requirements are for a splice case for pressurised cables, such as main cables in a telecommunications system. These cables are pressurised to prevent ingress of water in the event of damage and to provide a means of fault detection. Here the product must withstand a pressure of the order of 10 psi (70 kPa) throughout its life, and a functional test designed to mirror such long term performance requires impermeability at, say, 70 kPa over 10 eight hour cycles between −40° C. and +60° C. in air (Bell cycle). An alternative cycle is in water over four hours at 105 kPa between 5° and 50° C. In addition to this cyclical environment test, the product may be tested for integrity by pressurisation at 150 kPa in water for about 15 minutes at 23° C. No leak should be observable. A product that is to operate continuously at pressure should also possess long term creep resistance if it is not to become significantly distorted during use.

In telecommunications distribution cables, for example, an ability to retain pressure is required as an indication of completeness of environmental sealing, although the cables are not pressurised during use. Various temperature/pressure cycles have been devised for this purpose, and one that is preferred is a modified Bell Cycle which involves temperature variation from −40° to 60° C. over 8 hours at an air pressure of 40 kPa. The splice case should show no leak after 10 cycles. An alternative cycle is a temperature variation between room temperature and 70° C. at a pressure of 105 kPa over 4 hours.

These and other cable splice cases may become pressurised through being exposed to sunlight, or through the heat involved in the last stages of heat recovery when the seals to the cable have been formed. In such cases it is necessary that the splice case be able to maintain this temporary, and generally rather low, pressure if the environmental seal is not to fail.

UK patent application No. 2135836 discloses a splice case or other hollow pressure vessel capable of pressure retention and made from a recoverable fabric. Such a splice case comprises a recoverable sleeve that can be wrapped around a cable splice and shrunk to seal to the cable. Installation is simple and the product is reliable even under unfavourable conditions.

Specific designs disclosed in the prior art may not be ideal for cheap, rapid manufacture and may not have sufficiently high recovery ratios for some uses.

SUMMARY OF THE INVENTION

We have now designed a recoverable wrap-around sleeve of specific design that can overcome problem of certain prior art designs. This is achieved by employing recoverable weft fibres in bundles, particularly at low eave densities.

This invention provides a heat recoverable tubular or wrap-around sleeve having a recovery ratio of at least 40% and being suitable for enclosing a junction between elongate substrates, which comprise:

(a) a polymeric matrix material; and (b) a recoverable fabric by virtue of which the sleeve is recoverable and which is rendered impervious by the matrix material, comprising heat recoverable weft fibres extending around the circumference of the sleeve in bundles of 2-6, and non recoverable warp fibres extending along the length of the sleeve.

The invention also provides a heat-recoverable tubular or wraparound sleeve having a recovery ratio of at least 40% and being suitable for enclosing a junction between elongate substrates, which comprises:

(a) a polymeric matrix material; and (b) a recoverable fabric by virtue of which the sleeve is recoverable and which is rendered impervious by the matrix material, comprising 24-35 heat recoverable fibres per cm in one direction and 2-6 non-recoverable fibres per cm in a substantially perpendicular direction and having a float of at least 2 in the recoverable fibres; and (c) optionally a liner for the sleeve, the liner having a central region of lrger cross-section, and end regions of smaller cross-section which provides transitions from the central region to the substrate and which can locate the liner with respect to the substrate.

DETAILED DESCRIPTION OF THE INVENTION

The extent to which the fabric need be impervious will of course depend on the use of the sleeve. Where the sleeve is used to seal a splice between pressurized cables a high imperviousness will be desirable if pressurization gas is not to be wasted. In other situations imperviousness to water, oil, fuel or hydraulic fluids may be required. A degree of perviousness will, in general, be tolerable depending on the nature of the substrate and on the length of time that the assembly will be in use.

The means for rendering the fabric substantially impervious is a polymeric material that is laminated to and may extend throughout the recoverable fabric. We prefer that a true composite structure be formed between the recoverable fabric and a polymeric material by means of which it is rendered impervious. We prefer that the polymeric material provides a matrix material through which the fabric extends (although the matrix material may be merely bonded to one or both sides of the fabric) and therefore that at least part of the fibre material be chemically and/or physically compatible with the polymeric material. By physically compatible we mean that the relevant properties of the two materials are similar or identical during lamination, recovery and use. Chemically similar materials are preferred, for example both recoverable fibres and matrix may be polyolefins, and preferred materials are high density and low density polyethylene respectively. The skilled man would be able to select other suitable pairs of materials. We have found that a recoverable fabric rendered impervious can have excellent pressure retention where imperviousness to air is required. The ability of the sleeve to retain pressure is not simply a question of porosity of the material, although it must ultimately be substantially free from holes, but is determined also by the ability of the material to withstand hoop stresses that are generated by pressure within the sleeve. It is with regard to this second effect that recoverable fabrics have been found to be particularly good. Fabric sleeves of small thickness have been found to be able to resist high pressures without significant ballooning or creep. It is furthermore surprising that this beneficial feature can be made use of in spite of the initial porosity of fabrics.

The sleeve and any liner may each be made in tubular form or wrap-around form. Wrap-around sleeves and liners are preferred since they can be installed around substrates having no free ends or where space is limited.

Several matters are to be borne in mind when designing the recoverable sleeve, and the first to be considered will be recovery ratio. The recovery ratio should be sufficient to allow the sleeve to be installed over the largest parts of the substrate and to recover into contact with the smallest parts. In a splice between telephone cables, the splice bundle will in general be from 2-6 times the cable diameter, and a sleeve having a recovery ratio of at least this size will be suitable. The sleeve preferably does not recover into engagement with the splice bundle, since if it did damage would result. Also, it is desirable that the splice case be re-enterable without damage. Thus, the final structure is preferably hollow.

The extent of recovery can also be expressed by quoting the change in a dimension as a percentage of the recoverable dimension before recovery. Expressed thus, recovery is at least 40%, particularly at least 50%, more particularly at least 75%. We have found that by using the weave designs and fibre types and tex values disclosed herein that recovery ratios of at least 75%, often also at least 77.7% (4.5:1), and frequently at least 78% can be achieved in a laminated composite product. Such high values are very difficult if not impossible to achieve using prior art designs. High recovery ratios allow fast installation times, require fewer sizes of product to cover a given range of substrate sizes (thus reducing inventory) and also may allow the use of a thin aluminum foil in conjunction with the fabric as a strengthening layer (we have found that with lower recovery ratios a metallized polymeric layer had to be used).

When the fibre is cross-linked by irradiation it is possible to incorporate the cross-linking step into the overall manufacture of the fibre, but at present we prefer to weave the fabric and then irradiate the fabric. The fibre can be extruded, stretched at a temperature below its melting temperature, preferably by an amount of from 800-2000%, then woven and then subjected to irradiation to effect cross-linking. An alternative way of making the fibre is to extrude the material, irradiate to cross-link, then heat the fibre preferably to above its melting temperature, stretch the fibre, and then cool. HDPE fibres are preferably irradiated with a dose of from about 5 to about 35 megarads, more preferably from about 5 to about 25 megarads, and most preferably from about 7 to about 18 megarads especialy from 6 to about 10 megarads. The gel content that results is preferably at least 20%, more preferably at least 30%, and most preferably at least 40%. In practice a maximum of about 90% will be sufficient for most purposes.

When recoverable by heat, the recovery temperature is preferably 60° C. or more, more preferably from 80°-250° C., such as 100°-150° C.

In general, the fabric will be constructed so that the recoverable fibres can effectively run at least in the direction where recovery is required. In the weave, therefore, the warp only, or the weft only, or both weft and warp, may be recoverable. In one embodiment, we prefer that the heat-recoverable fibres are in the weft only. Providing the heat recoverable fibres in the weft only enables us to make tubular or wraparound articles in which the recoverable fibres extend around the circumference of the article, in a continuous process, the articles later being cut to their desired length. In more complicated weaves, such as a triaxial weave, one or both warps may be recoverable. An advantage of the use of fabrics is that perfect uniaxial recovery, or a chosen split in recovery between two directions, may be achieved.

According to one aspect of the invention there are 10-35 heat recoverable fibres per cm, and the fibres preferably have a diameter of from 0.2-0.5 mm. Preferably in the case of 0.3 mm diameter fibres there are 24-35, especially 26-30 heat recoverable fibres per cm, for example about 28-30 28.3 being chosen in one embodiment. Preferably the heat recoverable fibres have a tex (weight per cm) of 60-150, for example 60-100 especially about 64, although heavier fibres, eg 0.4-0.5 mm may be used with advantage at lower weave densities. Higher weaving speeds can thus be achieved. With such fibres, weave densities of 10-25 fibres per cm may be preferred.

According to the first aspect of the invention there are 2-6 non recoverable fibres per cm. Preferably there are 3 to 4 non recoverable fibres per cm. For example about 3.54. Preferred tex for the non-recoverable fibres include the following: 1,2 or 3×34 and 1,2, or 3×68.

The fibre size and weave densities are preferably chosen to produce a low cover factor (the percentage of a plane in which a sample of the fabric lies that is covered by fibre thereof) of the fabric of 50-85%, more preferably 55-70% since this can allow higher recovery ratios in spite of the reduced amount of recoverable fibre.

The fibres used to produce the recoverable fabric may be monofilaments or multifilaments, including spun, staple yarns or yarns produced by fibrillation, for example from film. In the case of multifilaments, the above weave densities refer to the monofilaments. Greater flexibility can be attained using multifilament yarns, although problems can be encountered in crosslinking due to the high surface area. Examples of polymeric materials that may be used as the recoverable fibres include polyolefins such as polyethylene (especially HDPE) and polypropylene, polyamides, polyesters and fluoropolymers such as FEP, ethylene perfluoro copolymer, polyvinylidene fluoride and TFE copolymers. The recovery temperature, by which we mean the temperature at which recovery will go substantially to completion, is preferably 60° C. or more, more preferably from 80°-250° C., most preferably from 100°-150° C.

The heat-recoverable fibres, which are preferably provided in the weft only, are preferably provided in bundles of 2-6, especially in bundles of 4. The bundle is preferably woven so that each fibre in the bundle lies directly adjacent its neighbour, so that the bundle is flat, and substantially parallel to the plane of the fabric. Providing the heat recoverable fibres in bundle means that weaving times are reduced, when the recoverable fibres are in the weft, compared to the weaving times necessary if the fibres are arranged individually. Also, we have found that for a tubular or wraparound article where the heat recoverable fibres extend around the circumference and heat stable fibres along the length of the article that longitudinal shrinkage of the article on recovery is reduced if the heat recoverale fibres are in bundles, compared to the longitudinal shrinkage experienced if the heat recoverable fibres are individual. Longitudinal shrinkage is thought to occur due to increase bonding or crimping of the non recoverable fibres as a result of tightening of the fabric caused by recovery of the recoverable fibres. Longitudinal shrinkage is for many applications disadvantageous. It may, for example, result in wrinkling, particularly at a transition zone between large and small cross sectional area of an article.

Non-recovreable fibres are used together with the recoverable fibres. The following non-recoverable materials may be regarded as illustrative: glass fibres, carbon fibres, wires or other metal fibres, polyesters, aromatic polymers such as aromatic polyamides for example Kevlar (trade name), imides and ceramincs. The non-recoverable component may be permanent, giving the recovered article enhanced strength etc., or may be present in discrete form only to locate the recoverable component during installation.

The means by which the fabric is rendered substantially impervious is a polymeric material laminated to and which preferably extends throughout the fabric. The sleeve of the invention thus preferably comprises a composite structure of a heat-recoverable fabric and polymer matrix material wherein:

(a) the heat recoverable fabric comprises fibres that will recover when heated, the fibres having a recovery stress Y of at least $1 \times 10^{-2}$, preferably at least $5 \times 10^{-2}$ more preferably at least 1 MPa at a temperature above their recovery temperature; and (b) the polymer matrix material has an elongation/-temperature profile such that there exists a temperature (T) which is at or above the recovery temperature of the fibres at which temperature the polymer matrix material has an elongation to break of greater than 20% preferably greater than 100%, especially from 400-700% and a 20% secant modulus X of at least $10^{-2}$ MPa (measured at a strain rate of 300% per minute), and at which temperature the inequality is satisfied:

$$\frac{X}{Y}\left(\frac{1-R}{R}\right) \text{ is less than one, preferably less than 0.5, more preferably less than 0.05.}$$

Wherein R is the mean effective volume fraction of heat-recoverable fibres in the composite structure along a given direction based on the total volume of the composite structure, or relevant portion thereof.

Such a recoverable composite structure can be made by applying a polymeric material to cross-linked recoverable fibres and then carry out further cross-linking.

The fibres are desirably cross-linked to increase their post-recovery strength, and a recovery stress of at least 0.1 MPa, preferably 0.5 to 5 MPa will generally be suitable. The polymeric material is desirably cross-linked to prevent it dripping or running during heat recovery, particularly during heat recovery by means of a torch. Too much cross-linking of the polymeric material will, however, reduce the recovery ratio of the composite structure. This can give rise to a problem since a different extent of cross-linking treatment may be required in the fibres and the polymeric material. This is the reason for the two cross-linking steps being carried out separately in the embodiment just described.

The composite structure may, nonetheless, be produced using a single cross-linking step if the beam response of the recoverable fibres relative to that of the polymeric material is such that a post-irradiation recovery stress of the fibres, per se, of at least 1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising the recoverable fabric and a polymer matrix material laminated thereto, in which:

(a) the recoverable fabric comprises a cross-linked recoverable polyolefin having a recovery stress of 0.5 to 5 MPa (b) the matrix is cross-linked such that the recovery ratio available in the composite is at least 65% of that available in the free fabric, and the polymeric matrix material, per se, after irradiation has room temperature elongation of 400–700% measured at a strain rate of 300%.

Irradiation, in addition to providing one means of cross-linking, can provide other features in the composite structure. If the fibres are irradiated, particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

The polymeric matrix material may be thermoplastic or elastomeric. Examples of thermoplastic materials include: ethylene/vinyl acetate copolymers, ethylene/ethyl acrylate copolymers, LLDPE, LDPE, MDPE, HDPE, polypropylene, polybutylene, polyesters, polyamides, polyetheramides, perfluoroethylene/ethylene copolymers, and polyvinylidene fluoride. The following is a list of preferred elastomeric materials: ABS block copolymers, acrylics including acrylates, methacrylates and their copolymers, high vinyl acetate copolymers with ethylene, polynorbornene, polyurethanes and silicone elastomers. These materials (or part of them) are preferably cross-linked, and this is conveniently carried out by subjecting the fabric to a suitable cross-linking agent after the fabric has been rendered impervious by incorporating the polymeric material.

The amount of polymeric material used should be sufficient to render the fabric sleeve substantially impervious to air when it is recovered. It is possible, therefore, for the polymeric material to be a discontinuous coating or impregnation before recovery, and optionally to melt or soften sufficiently to be brought together on recovery to provide a substantially impervious barrier. We prefer, however, that the composite of fabric and polymeric material be substantially impervious before as well as after recovery. The thickness of the polymeric material should be great enough to allow the desired pressure, if any, to be retained, but small enough to allow the fabric to recover to the desired extent. The composite desirably recovers as a unit with no appreciable drawing-through of fabric within the matrix. A suitable thickness of polymeric material is 0.5–1.5 mm preferably about 0.2 mm on the inside of the sleeve and about 0.5 mm on the outside of the sleeve. We have found that an unstressed layer of a polymeric material of thickness of at least 0.03 mm especially 0.2 to 2.0 mm on the outside surface of the sleeve provides a considerable improvement in the ease with which the fabric can safely be recovered using a torch such as a propane torch. Such polymeric layer will generally soften during recovery but has a sufficiently high viscosity that is retained by the fabric. A polymeric material initially having a sufficiently high viscosity may be used, or the viscosity of a low viscosity material may be increased by cross-linking, particularly by beaming.

Where two layers of polymeric material are provided one on each side of the sleeve, both layers may be cross-linked, for example by irradiation, or only the layer on the outer surface of the sleeve.

The sleeve is preferably provided with a strengthening layer that is capable either of minimising adhesive burst-through on recovery, or reducing moisture vapour transmission of the article in service or improving creep resistance in service, or of improving pressure retention of the article in service, or any combination thereof. Such a layer is described in copending British patent application No. 8625126 filed Oct. 20, 1986 (B131), the disclosure of which is incorporated herein by reference.

The sleeve is preferably coated with an adhesive on its inside, ie. on that side which will face the substrate to be enclosed, although the polymeric material providing imperviousness may alone provide the desired adhesiveness under installation conditions. Heat-activatable adhesives are preferred, especially hot-melt adhesives such as polyamides and EVAs.

Where an enclosure has to be built around a simple end-to-end joint between two cables a simple sleeve can be used which shrinks into contact with each cable. However, problems may arise where two or more cables or other substrates have to be sealed at one position. This problem, which is known as branch-off, occurs in a cable splice where one cable is divided into two. This problem can be overcome by providing means such as a clip for holding together circumferentially spaced portions of an outlet of the fabric sleeve to close at least partially the crutch region between the diverging cables.

The problem of branch-off can, however, be overcome by producing the fabric sleeve in the correct shape to accomodate two or more branching substrates.

The following example is given to illustrate a cable splice case built from peferred materials.

EXAMPLE

The following HDPE monofilament was chosen to provide the recoverable component of a broken twill 2/2 weave.

| | |
|---|---|
| MN | 24500 |
| Mw | 135760 |
| Mz | 459000 |
| Mp | 64400 |
| D | 5.378 |
| Initial Modulus (MPa) | 3881.3 |
| % Elongation (21° C.) | 21 |
| Tensile Strength (MPa) | 534.4 |
| Monofilament dia (MM) | 0.38 |

This fibre had the following properties:

| | Fibre Properties Radiation Dosage (Mrads) | | | |
|---|---|---|---|---|
| Property | 0 | 8 | 16 | 32 |
| Modulus (MPa) | | 0.13 | 0.3 | 0.42 |
| Tensile Strength (MPa) | | 0.93 | 1.4 | 1.46 |
| elongation to Break (%) | | 1480 | 924 | 754 |
| Gel Content (%) | | 27.0 | 58.0 | 67.0 |
| Recovery Force (MPa) | | 1.17 | 1.2 | 1.3 |
| Recovery (%) | | 89 | 88.5 | 88.5 |

The HDPE fibres were arranged in bundles of 4, and woven with non-recoverable glass fibres to produce a broken twill 2/2 weave, ie a broken twill having a float of 2. In each case the recoverable HDPE bundles wer the weft fibre and glass was the warp fibre, and the float was in the weft.

The glass fibres are preferably ones having the designation EC 9 34 tex×25152. This type of designation is standard and will be understood by those in the art. Briefly it has the following meaning Ec refers to the tex value of the bundles of filaments, ×2S refers to the number of monfilaments in a bundle, 152 refers to 152 twists in the bundles per meter.

The warp density was 3.5 ends/cm, and the weft density was about 28.4 ends per cm (7.1 bundles of 4 fibres per cm). After irradiation at an electron beam dose of 7.8 megarads, the value shown on an integrity hold-out test was 6.5-9 Newtons per 80 fibres of the fabric.

The fabric was rendered substantially impervious by laminating to it a low density polyethylene at a thickness of 0.3 mm on one side and 0.6 mm on the other side. Lamination was carried out at such a temperature, pressure and processing speed that the material permeated the interstices of the fabric but not recovery occurred. The resulting composite was subjected ot a second irradiation step with 6 MeV electrons in air at room temperature at a dose rate of 0.24 Mrads/min for time sufficient toproduce a radiation dose of 2.0-3.0 Mrads.

The resulting composite material had a recovery of 75%. The composite material was used to produce a wrap-around sleeve suitable for use as a splice case for enclosing a splice between two telephone cables. Closure members were attached to or formed at opposing edge portion of the sleeve such that the recoverable fibres ran from one closure member to the other. The sleeve could therefore be held in a wrapped around configuration by sliding a closure channel over the two closure members. The sleeve was therefore radially recoverable. Prior to attachment of the closure members, the composite material was coated with a hot-melt adhesive in each side which would be inwardly facing when the sleeve was in the wrapped around configuration.

The adhesive used was a polyamide, modified with up to 1% of an acrylic rubber, applied to a thickness of 0.5 mm.

In order to reduce the amount of adhesive required, it was coated only around each end of the sleeve, in general this will require some sort of lubricant layer over the rest of the sleeve or over the liner. Adhesive is required at the ends for bonding to the spliced cables that will enter and leave the installed sleeve. If desired, however, the adhesive may be coated over the entire internal surface of the sleeve, and such adhesive may act as the lubricant mentioned above.

The sleeve was used in conjunction with a liner which comprised an aluminium canister of about 75% of the length of the sleeve and having crowned ends which could be deformed to provide smooth 30° C. transitions. The diameter of the canister was chosen to be about 75-90% of the diameter of the assembled sleeve in order to ensure some degree of unresolved recovery.

Figure 1:
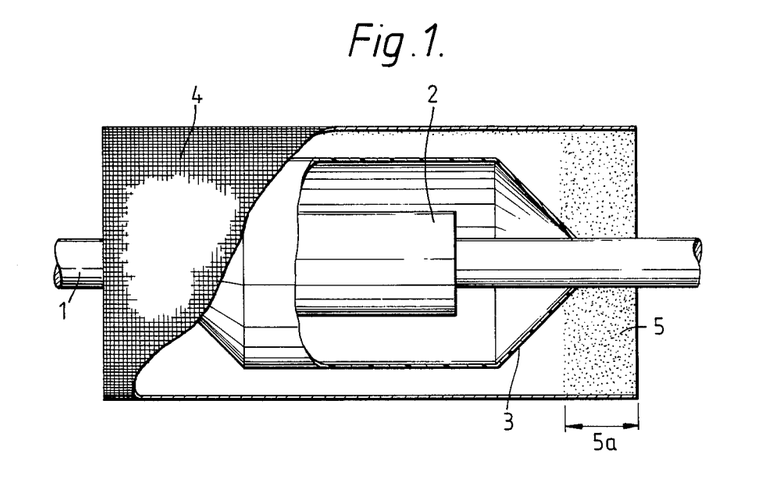
FIG. 1 shows a joint between two substrates surrounded by a liner and an unrecovered sleeve.
Figure 2:
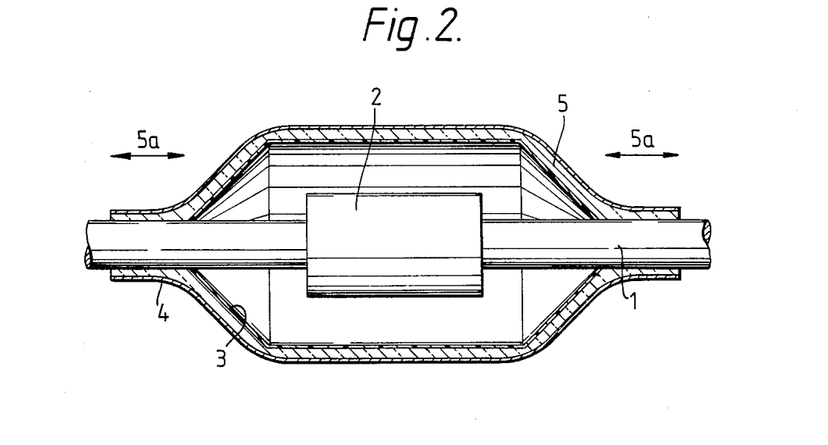
FIG. 2 shows a similar joint but with the sleeve after recovery.
Figure 3:
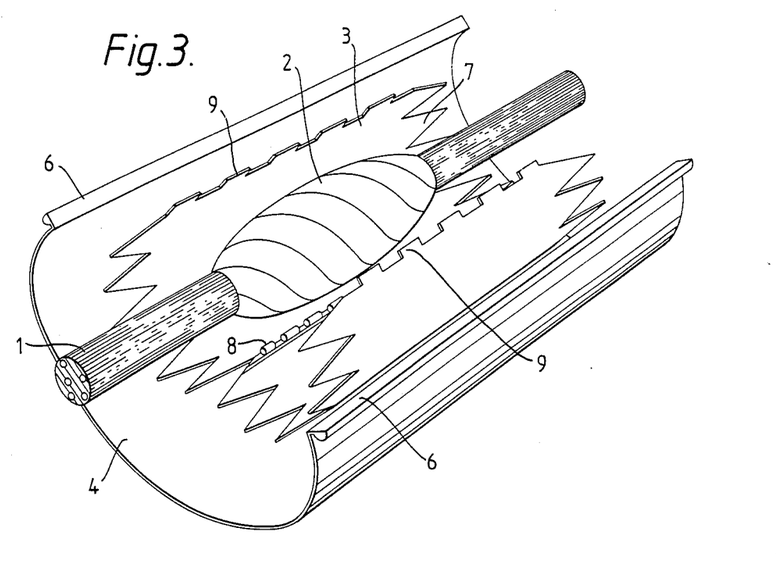
FIG. 3 shows a cable splice partially surrounded by a wrap-around liner and a wrap-around recoverable sleeve.
Figure 4:
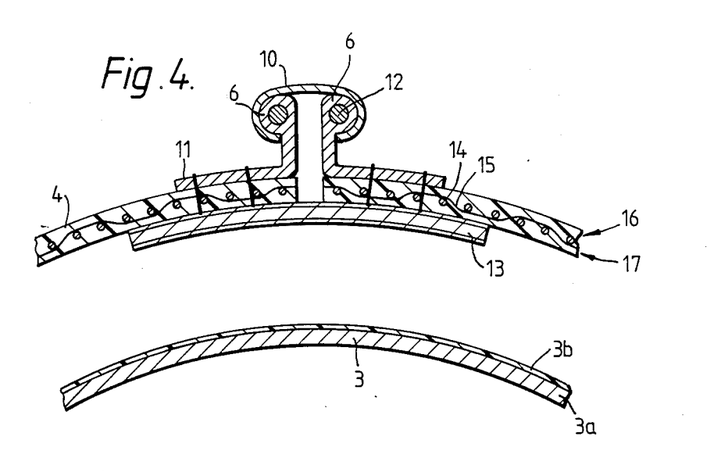
FIG. 4 shows in partial transverse cross-section a warp-around sleeve and liner.

The invention is further illustrated with reference to the accompanying drawings, in which:

FIG. 1 shows a joint between two substrates surrounded by a liner and an unrecovered sleeve;

FIG. 2 shows a similar joint but with the sleeve after recovery;

FIG. 3 shows a cable splice partially surrounded by a wrap-around liner and a wrap-around recoverable sleeve;

FIG. 4 shows in partial transverse cross-section a wrap-around sleeve and liner; and FIGS. 5 to 7 show the fabric design for broken twill 2/2 twill 2/2 and satin 4 respectively.

Two substrates 1 are joined at a joint region 2 and surrounded by a liner 3 and recoverable fabric sleeve 4 comprising a weft of 10-35 heat recoverable high density polyethylene fibres per cm in bundles of 2-6, preferably 4 and a warp of 2-6 glass fibres per cm. The weave is a broken twill 2/2 having a float of 2. In FIG. 1 the sleeve is shown before recovery, and in FIG. 2 it is shown after recovery. In FIGS. 1 and 2 an adhesive 5 can be seen bonding the sleeve to the substrates 1 and to the liner 3. The adhesive is preferably supplied coated to the internal surface of the sleeve at least at its ends as indicated at 5a. Where recovery is initiated by heat, the adhesive is preferably heat-activatable so that the single step of heating causes recovery if the sleeve and activation of the adhesive.

A thin layer of adhesive maycover the entire surface of the sleeve, and thicker layers of adhesive be provided at regions 5a.

In FIG. 3 the substrates 1 are shown as multiconductor cables, and region 2 is a splice bundle joining the two cables. In this Figure both the liner 3 and the fabric sleeve 4 are wrap-around. The liner is hinged at 8 and has castellated edges 9 to ensure rigidity when closed. The sleeve is provided with closure members 6 at its longitudinal edges which can be held together with an elongate channel of C-shaped cross section (not shown) to maintain the sleeve in a wrapped around configuration. Other types of closure, for example a zipper, may be used and in general what is preferred is a mechanical closure for maintaining edge regions of the fabric in proximate relationship during recovery. The liner has crowned ends 7 which provide transitions for its central region to the cables 1 and which locate the liner with respect to the cables, thereby allowing production if desired, of a hollow pressure vessel having outlet portions only recovered into engagement with the cables.

FIG. 4 shows a recoverable wrap-around fabric sleeve 4 and liner 3 in partial transverse cross-section. The closure is formed by means of closure members 6 preferably elongate members running substantially the length of the sleeve and attached to edge portions of the sleeve 4 and held together by a closure channel 10. The closure members comprise a fabric strip 11 stitched or stapled onto each edge of the sleeve. A rod, rope or cord may be used to form a thickened edge region to each strip 11 as indicated at 12.

Any gap between the closure members 6 may be sealed by a flap 13 that runs the length of the sleeve and bridges the closure members.

The fabric of the sleeve may be seen to comprise circumferential bundles of recoverable fibres 15, (not shown individually), for example crosslinked high density polyethylene interwoven with circumferential non-recoverable fibres 14, for example glass, rayon or Kevlar. The float of 2 in the weft is also reflected in the warp, and can be seen in the drawing.

The liner 3 comprises an aluminium canister 3a to which is laminated a film of a suitable material such as an ethylene copolymer.

The fabric of the sleeve is laminated by a double lamination process. The outside of the sleeve is coated with a low density polyethylene 16 of thickness about 0.6 mm, and the inside with a low density polyethylene 17 of thickness about 0.3 mm.

If desired, the construction of the sleeve may contain one or more additional layers. For example, a film may be provided between the composite structure of fabric and polymeric matrix material, and the internal layer of hot-melt or other adhesive. Such a film is preferably thin in order not to restrict shrinkage of the sleeve. If such additional layer or layers are used one may use a very loose or open weave, for example a satin or leno (or a weft or warp insertion knit) of weave density of say, 10–25 heat-recoverable fibres per cm and, say, 1–6 non-recoverable fibres per cm. Stability of the product is increased using the extra layer, adhesive burst through is reduced and air leaks are reduced. The film may be made of any suitable material that has one surface that can adhere to the composite structure (fibre or matrix) and an opposite surface that can adhere to the adhesive. Examples inlcude aluminium, mylar, nylon 6, nylon 6,6, thermoplastic polyurethanes or two or more of these. We have found that the more open weaves (lower cover factor) of lower weave densities are able to be used with aluminium film whereas prior art weave designs require the more flexible polymeric films instead. This is due to the higher recovery ratios of the open weaves enabling proper deformation of the thicker aluminium films.

Figure 5A:
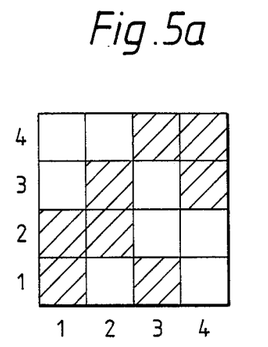
FIGS. 5a and 5b show the fabric design for broken twill 2/2.
Figure 5B:
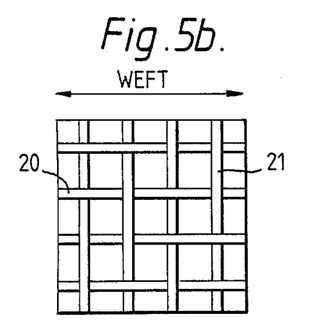

The fabrics used in this specific example is a broken twill 2/2 (two up/two down), in which the heat recoverable fibres are in the weft and the non-recoverable fibres are in the warp. The fabric design has a float of 2. The fabric design is illustrated in FIGS. 5a and 5b. FIG. 5a is a block diagram as used in the fabrication industry. The 4 by 4 square block illustrates the subsequent passage of 4 adjacent fibres in each of the warp and the weft. A white square illustrates a fibre passing over the fibre in the other direction, and a hatched square a fibre passing under the fibre in the opposite direction. This is also illustrated in the more literal diagram FIG. 5b in which the heat recoverable fibres are reference 20 and the non recoverable fibres 21. The heat recoverable fibres in bundles (fibres (not shown individually) extend in the weft which has been depicted as the direction running from left to right of the page. Thus in rows 1 and 3, the heat recoverable fibres pass alternatively under and over individual non-recoverable fibres, while in rows 2 and 4 the heat-recoverable fibres pass alternatively under and over pairs of non recoverable fibres. The 2/2 references denotes this 2 over, 2 under configuration. The float is thus 2.

Figure 6A:
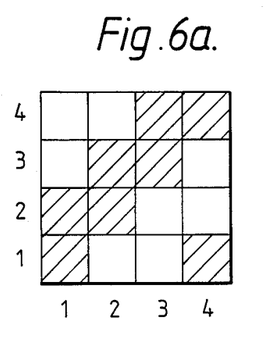
FIGS. 6a and 6b show the fabric design for twill 2/2.
Figure 6B:
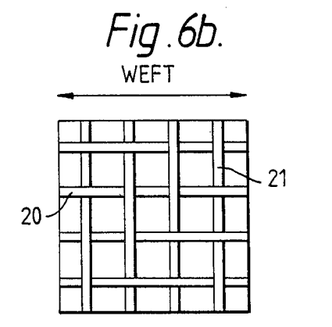
Figure 7A:
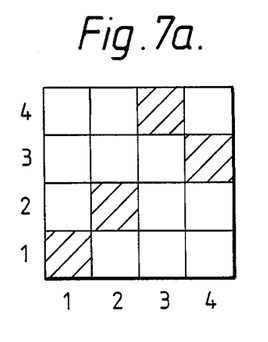
FIGS. 7a and 7b show the fabric design for satin 4.
Figure 7B:
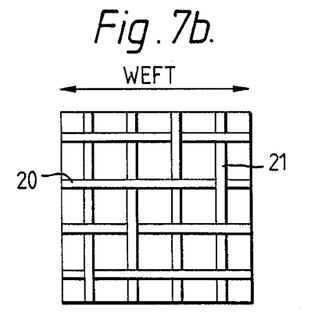

FIGS. 6a and 6b show the corresponding design for twill 2/2 in which the float is also 2. FIGS. 7a and 7b show the corresponding design for satin 4 in which the float is 3, that is a heat recoverable fibre passes over 3 non-recoverable fibres and then under one.

For the avoidance of doubt it is here indicated that the invention provides a fabric sleeve suitable as a splice case that can embody any one or more of the features disclosed herein. For example any one or more of the materials, weave designs, the inclusion of an additional layer, closure geometries or configurations, processing steps or ancilliary components may be selected.

We claim:

1. A heat-recoverable tubular or wrap-around sleeve having a recovery ratio of at least 40% and being suitable for enclosing a junction between elongate substrates, which comprises:
   (a) a polymeric matrix material; and
   (b) a recoverable woven fabric by virtue of which the sleeve is recoverable and which is rendered impervious by the matrix material, comprising 10–35 heat recoverable weft fibres per cm. extending around the circumference of the sleeve in bundles of 2–6, and 2–6 non recoverable warp fibres per cm. extending along the length of the sleeve.

2. A sleeve according to claim 1, having a recovery ratio of at least 75%.

3. A sleeve according to claim 1, having a recovery ratio of at least 77.7%.

4. A sleeve according to claim 1, in which the fabric has from 10–25 recoverable fibres per cm.

5. A sleeve according to claim 4, in which the fabric has from 14–18 recoverable fibres per cm.

6. A sleeve according to claim1, in which the fabric comprises recoverable fibres having a diameter of from 0.2–0.5 mm.

7. A sleeve according to claim 6, in which the fabric comprises recoverable fibres having a diameter of from 0.3–0.4 mm.

8. A sleeve according to claim 1, having a cover factor of 50–85%.

9. A sleeve according to claim 1, in which the fabric has a float of at least 2 in the recoverable fibres.

10. A sleeve according to claim 1, wherein the weave is selected from the group of weaves consisting of broken twill 2/2, twill 2/2, satin 4, or satin 5.

11. A sleeve according to claim 1, in which the fibres are cross-linked.

12. A sleeve according to claim 1, in which the recoverable fibres comprise polyethylene.

13. A sleeve according to claim 1, in which the fabric contains glass fibres or fibres of an aromatic polyamide or of a polyester as the non-recoverable fibres.

14. A sleeve according to claim1, having an internal coating of a heat-activatable adhesive.

15. A junction between elongate substrates when enclosed by a sleeve according to claim 1.

16. A junction according to claim 15, in which the substrates comprise telecommunications cables.

17. A sleeve according to claim 1 wherein the fibres are as multifilament fibres.

18. A sleeve according to claim 9 whereinn the fibres are as multifilament fibres.

19. A sleeve according to claim 10 wherein the fibres are as multifilament fibres.

20. A heat-recoverable tubular or wrap-around sleeve having a recovery ratio of at least 40% and being suitable for enclosing a junction between elongate substrates, which comprises:
   (a) a polymeric matrix material; and
   (b) a recoverable fabric by virtue of which the sleeve is recoverable and which is rendered impervious by the matrix material, comprising 24–35 heat-recoverable fibres per cm. in the weft direction and 2–6 nonrecoverable fibres per cm. in the warp direction and having a float of at least 2 in the recoverable fibres.

21. A sleeve according to claim 20 further including a liner for the sleeve, the liner having a central region of larger cross-section and end regions of smaller cross-section which provides transitions from the central region to the substrate and which can locate the liner with respect to the substrate.

22. A sleeve according to claim 20 wherein the fibres are as multifilament fibres.

23. A heat-recoverable tubular or wrap-around sleeve having a recovery ratio of at least 40% and being suitable for enclosing a junction between elongate substrates, which comprises:
   (a) a polymeric matrix material; and
   (b) a recoverable fabric by virtue of which the sleeve is recoverable and which is rendered impervious by the matrix material, comprising 10–35 heat-recoverable weft fibres per cm. extending around the circumference of the sleeve in bundles of 2–6, said heat-recoverable weft fibres having a diameter of from 0.2–0.5 mm, and 2–6 non recoverable fibres per cm. extending along the length of the sleeve, and wherein the fabric has a float of at least 2 in the heat-recoverable fibres.

24. A sleeve according to claim 23 wherein the fibres are as multifilament fibres.

* * * * *